(12) United States Patent
Sakashita (10) Patent No.: US 6,466,868 B2
(45) Date of Patent: Oct. 15, 2002

(54) NAVIGATION DEVICE FOR USE IN AUTOMOTIVE VEHICLE

(75) Inventor: Naohiro Sakashita, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/824,729

(22) Filed: Apr. 4, 2001

(65) Prior Publication Data

US 2002/0032523 A1 Mar. 14, 2002

(30) Foreign Application Priority Data

Apr. 25, 2000 (JP) ........................................ 2000-123848

(51) Int. Cl.⁷ ............................................. G06F 15/00
(52) U.S. Cl. ...................... 701/211; 701/206; 701/207; 701/208
(58) Field of Search ................................ 701/211, 206, 701/207, 208, 212, 210, 213

(56) References Cited

U.S. PATENT DOCUMENTS

| | | | | | |
|---|---|---|---|---|---|
| 5,991,689 | A | * | 11/1999 | Aito et al. ................... | 701/209 |
| 6,035,253 | A | * | 3/2000 | Hayashi et al. ............. | 701/211 |
| 6,115,669 | A | * | 9/2000 | Watanabe et al. ........... | 701/211 |
| 6,226,590 | B1 | * | 5/2001 | Fukaga et al. ............... | 701/209 |
| 6,269,303 | B1 | * | 7/2001 | Watanabe et al. ........... | 701/209 |
| 6,282,490 | B1 | * | 8/2001 | Nimura et al. .............. | 701/208 |

FOREIGN PATENT DOCUMENTS

| | | |
|---|---|---|
| JP | A-9-196694 | 7/1997 |
| JP | A-11-094582 | 4/1999 |
| JP | A-11-311535 | 11/1999 |

* cited by examiner

Primary Examiner—Richard M. Camby
(74) Attorney, Agent, or Firm—Law Offices of David G. Posz

(57) ABSTRACT

A navigation device provides a driver with proper instructions to which direction to drive when he approaches a junction at which an entering road branches out into two or more outgoing roads. Such instructions are generated not only based on a physical structure of the junction and road names but also based on a customary way of driving. When the entering road name is the same as the outgoing road name toward destination, a driver customarily keeps a through-traffic lane. If the outgoing road toward his destination branches out to a side opposite to the through-traffic lane, he would drive onto a wrong road. Under such situation, the navigation device according to the present invention gives a driver clear instructions to which direction he should drive.

35 Claims, 4 Drawing Sheets

NAVIGATION DEVICE FOR USE IN AUTOMOTIVE VEHICLE

CROSS-REFERENCE TO RELATED APPLICATION

This application is based upon and claims benefit of priority of Japanese Patent Application No. 2000-123848 filed on Apr. 25, 2000, the content of which is incorporated herein by reference.

BACKGROUND OF THE INVENTION

1. Field of the Invention

The present invention relates to a navigation device for use in an automotive vehicle, and more particularly to a navigation device having a function to give route guidance to a driver every time a vehicle approaches a branching point, especially a junction, located on a planned route.

2. Description of Related Art

A navigation device for an automotive vehicle, which locates a present position of a vehicle, sets a route plan and gives route guidance to a driver, is known hitherto. Usually, the located present position of the vehicle and the planned route toward destination are displayed on a display panel. It is also known to give voice guidance to a driver when a vehicle approaches a branching point on the planned route. For example, voice guidance such as "turn to right at an intersection 50 meters ahead" is given to the driver. Such voice guidance is not given at all branching points, but it is given at particular branching points where it is difficult for the driver to correctly follow the planned route without such guidance. For example, if a minor road is simply connected to a main road and the driver can easily enter the main road on the planned route without guidance, no guidance is given.

On the other hand, the guidance is given at a branching point such as a junction where a road entering the junction branches out into two or more roads outgoing from the junction. For example, if the outgoing road toward destination has the same road name as the entering road, a voice guidance, such as "continue to proceed to the present road" or "keep driving on the same road" is given to the driver.

The above situation will be further explained, taking an example in Japan where a left-side driving system is employed. If there are two lanes on a highway including an expressway, slow traffic moves on the left lane and the right lane is a speed lane. When a driver approaches a junction where a road toward his destination is directed to the right side of the junction, he drives on the right lane on the road entering the junction. If the entering road has the same name as the outgoing road toward his destination, voice guidance such as "keep driving on the same road" would be appropriate. However, there is another situation where the outgoing road toward his destination has the same name as the entering road another outgoing road is directed to the right side of the junction. In this case, if the voice guidance such as "keep driving the same road" is given, it is possible for the driver to proceed to the wrong road branching out to the right side from the junction. If the driver is very familiar to the structure of the particular junction, he may not be misled. However, there is a possibility in the conventional navigation device to mislead the driver.

SUMMARY OF THE INVENTION

The present invention has been made in view of the above-mentioned problem, and an object of the present invention is to provide an improved navigation device which is able to give a driver appropriate route guidance at a branching point, especially at a junction.

A navigation device for use in an automobile vehicle is mainly composed of a vehicle position detector including a GPS receiver, a map data feeder, a keyboard, a display panel and a speaker. A driver inputs his destination at a starting point. The navigation device sets a route plan from the starting point to the destination on the map displayed on the display panel. When the vehicle approaches a branching point, especially a junction, located on the route plan, the navigation device instructs the driver to which direction to drive. At a junction, one road entering the junction branches out into tow or more roads outgoing from the junction including an outgoing road toward destination.

The navigation device determines whether the entering road has the same name as that of the outgoing road toward destination, whether a traffic system is a left side driving system or a right side driving system, and whether at which side of the outgoing road toward destination the other outgoing roads are located. The instructions to which direction to drive are generated based on those determinations. Under the left side driving system as in Japan, if the outgoing road toward destination has the same name as the entering road, the navigation device instructs to drive to the left if the other outgoing roads are located at the right side of the outgoing road toward destination and to drive straight if the other outgoing roads are located at the left side. Under the right side driving system as in the U.S.A., the navigation device instructs to drive to the right if the other outgoing roads are located at the left side and to drive straight if the other outgoing roads are located at the right side.

If the outgoing road toward destination has a name different from that of the entering road, it is not necessary to give special instruction as above, because the driver is properly guided by usual instructions. It is preferable to give the driver the instructions by means of voice guidance in addition to the route plan displayed on the display panel. The route guidance process performed in the navigation system may be stored in a memory medium as a computer program.

A driver is properly guided by the navigation device according to the present invention because instructions to which direction to drive through a junction are generated, not only based on a physical structure of the junction and road names but also based on a customary way of driving. Under the left side driving system, a driver usually keeps right when he drives through a junction if an outgoing road toward destination has the same name as the entering road. Therefore, if the outgoing road toward destination extends leftward under such situation, the instructions to drive to the left are very helpful to the driver. On the other hand, if the outgoing road toward destination is located at the right side of the junction, the instructions to drive straight lead the driver to the proper direction. The same is applicable to the right side driving system though the left and the right are reversed.

Other objects and features of the present invention will become more readily apparent from a better understanding of the preferred embodiment described below with reference to the following drawings.

DETAILED DESCRIPTION OF THE PREFERRED EMBODIMENT

A preferred embodiment of the present invention will be described with reference to the drawings. First, referring to FIG. 1B, an entire structure of a navigation device which is able to communicate with an information center shown in FIG. 1A will be described. The navigation device 20 includes a vehicle position detector 22, a map data feeder 24, a group of switches 26, a remote controller sensor 27, a display panel 28, a speaker 30, an outside memory 32, a communication device 34, and electronic controller 36.

The vehicle position detector 22 is composed of known components: a gyroscope 38, a vehicle speed sensor 40, a GPS receiver 42 which receives radio waves from a GPS system. Since each of those components includes certain detection errors, plural components are used for accurately detecting the vehicle position by supplementing errors. However, it is not always necessary to use all of those components. A terrestrial magnetism sensor, a rotational angle sensor for a steering wheel, or a wheel rotational sensor may be used in addition to or in place of certain components.

The map data feeder 24 feeds map data stored in a memory medium to the electronic controller 36. The map data include data showing road connections (road network data), data for map matching for improving accuracy of vehicle position detection. As the memory medium storing the map data, a CD-ROM or a DVD is usually used, but a memory card or other medium may be used. The road network format includes link information, node information and inter-link connection information. The link information includes: link IDs for identifying respective links; link-classes for differentiating an expressway, a toll road, a usual highway, an added road and so on from one another; and information regarding a link itself such as data showing coordinates of a beginning and end points of a link and data showing a link length. The node information includes: node IDs for identifying respective nodes connecting links; information regarding regulations such as no-left-turn or no-right-turn at an intersection; and information as to whether a traffic signal is equipped or not at a particular intersection. The inter-link connection information includes information such as one-way traffic and traffic prohibition due to construction or other reasons. There are situations where traffic is allowed to enter a certain link from one link but is prohibited to enter it from the other link. Accordingly, the traffic condition in a particular link is determined by the inter-link connection situation.

The group of switches 26 includes various switches for operating the navigation device 20, such as switches for changing displays on the display panel 28 and switches for inputting a destination and other information necessary to determine a planned route. The switches for changing the displays may be touch-switches formed integrally with the display panel 28 or may be mechanical switches. The remote controller sensor 27 receives signals sent from a remote controller 27a operated by a user. The navigation device 20 is operated either by the group of switches 26 or the remote controller 27a.

The display panel 28 displays thereon a map fed from the map data feeder 24, a mark showing a present vehicle position fed from the vehicle position detector 22, and a route plan set by the navigation device. The route plan is overlapped on the map shown on the display panel 28. The speaker 30 announces voice guidance in addition to a route guidance shown on the display panel 28. For example, voice guidance such as "turn to right at the next intersection" is given to the driver. Since the driver is guided by the voice, he can drive more safely without looking at the display panel.

The outside memory 32 stores therein the route plan set by the electronic controller 36, and the stored memory is backed up by a power source (not shown). The communication device 34 receives information (e.g. information for Vehicle Information and Communication System—VICS) sent from the information center 10, and transmits information to outside devices or systems. The information received by the communication system 34 is processed in the electronic controller 36. As the communication device 34, an automobile phone or a mobile phone may be used, or other devices specialized for this purpose may be used. The electronic controller 36 is composed of a known computer including CPU, ROM, RAM, I/O, and bus lines connecting those components. The electronic controller 36 controls the display panel 28, the speaker 30, the outside memory 32 and the communication device 34, based on inputs fed from the vehicle position detector 22, the map data feeder 24, the switches 26 and the remote controller sensor 27.

Figure 1A:
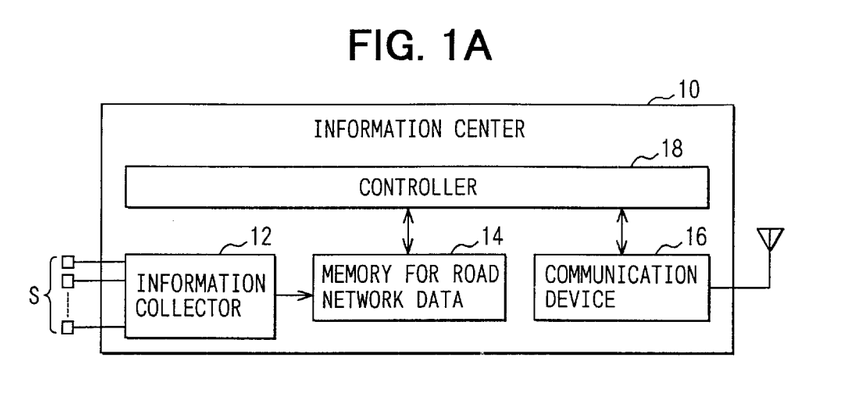
FIG. 1A is a block diagram showing an information center for supplying various pieces of traffic information to a navigation device mounted on an automotive vehicle.
Figure 1B:
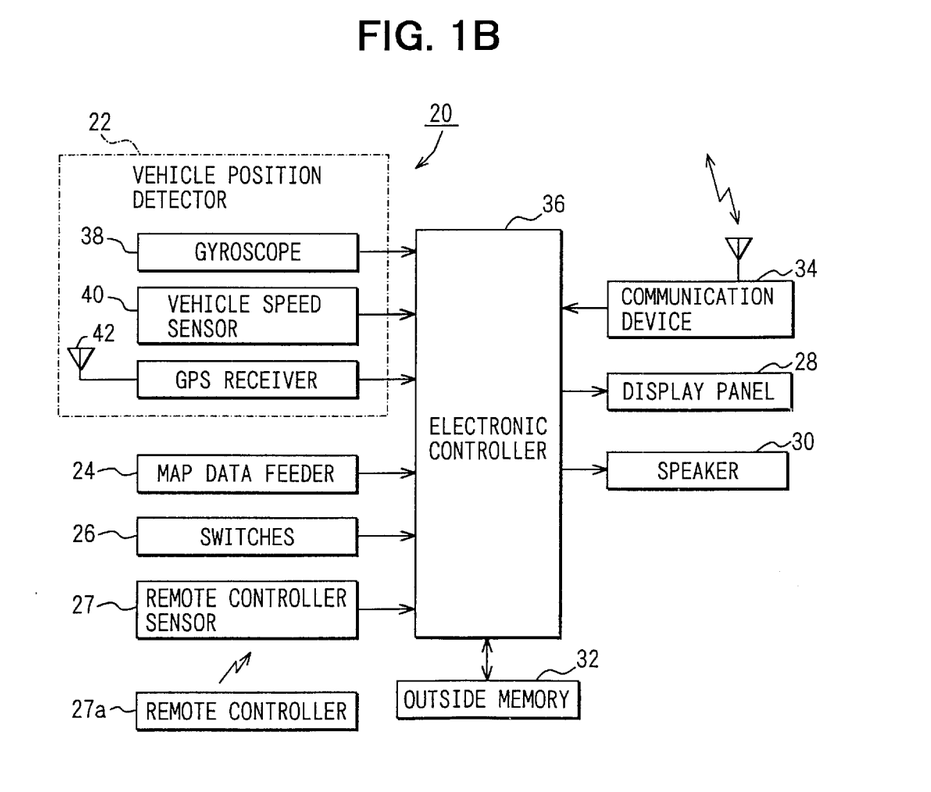
FIG. 1B is a block diagram showing a navigation device mounted on an automotive vehicle.

The structure of the information center 10 shown in FIG. 1A will be briefly explained. The information center 10 is composed of: an information collector 12 for collecting outside information such as traffic jam or regulations fed from roadside sensors S; a road network data memory 14 that stores road maps of an area covered by the information center and various traffic and road information collected by the information collector 12; a communication device 16 that wirelessly communicates with the navigation device 20; and a controller 18 that specifies particular roads under certain regulations, traffic jam and so on, based on vehicle position data sent from the navigation device 20 and information fed from the information collector 12. The controller 18 controls an entire operation of the communication center 10.

The navigation device 20 described above operates in the following manner. First, a driver inputs his destination using the switches 26. The electronic controller 36 automatically sets a route plan, which is most appropriate, from the starting point to the destination and displays the route plan on the display panel 28. The driver is also guided by voice guidance given through the speaker 30. The process of setting the route plan and the process of route guidance will be described in detail with reference to FIGS. 2 and 3.

Figure 2:
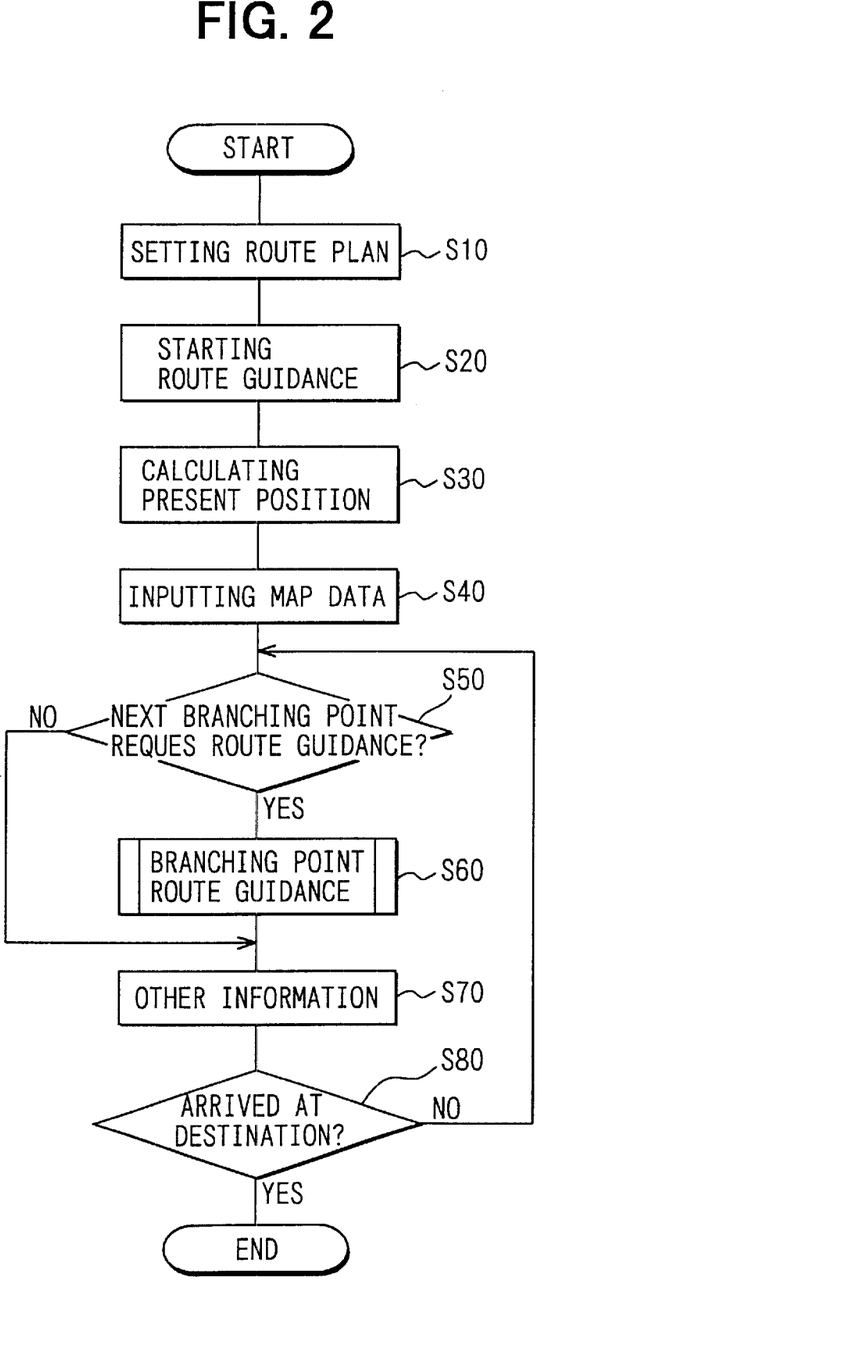
FIG. 2 is a flowchart showing a route guidance process performed in the navigation device.

Referring to FIG. 2, upon starting the process, the route plan from the starting point to the destination fed by the driver is set at step S10. That is, the driver inputs his destination based on the road map shown on the display panel 28. The starting point is determined based on the data sent from the GPS receiver 42. Then, the driving route from the starting point to the destination is calculated, based on Dijkstra method, to make the route shortest and most economical. Then, the process proceeds to step S20, where the route guidance is started and the driver drives according to the guidance. At step S30, a present position of the vehicle driving on the planned route is calculated based on the data fed from the vehicle position detector 22. At step S40, map data from the present position to a point having a certain distance from the present position are obtained.

Then, at step S50, whether or not the next branching point located on the planned route is a branching point that requires route guidance (referred to as a branching point guidance). When the branching point guidance is performed, the driver is instructed by the navigation device as to which direction he should drive to pass the branching point. Such guidance is not required at all branching points. Therefore, the branching points at which the guidance is required are selected from among all the branching points, considering particular structures of each branching point and other conditions. All the junctions are categorized in a branching point group requiring guidance. A branching point where a driver can easily drive through without special instructions is categorized in a group requiring no guidance. For example, if two roads cross each other with a substantially right angle and a planned route is set to drive straight, no special guidance is required. Another example: if a planned route is a main road curving at an intersection where a minor road crosses the main road, the driver easily drives through the intersection along the main road without special guidance. The link-class mentioned above relates to judgment as to whether a road is a main road or a minor road. This link-class is set in the road network data fed from the map data feeder 24.

If it is determined that the next branching point is a branching point requiring guidance at step S50, the process proceeds to step S60. The route guidance performed at step S60 (branching point guidance) will be explained later in detail with reference to FIG. 3. Then, the process proceeds to step S70, where other information ancillary to the route guidance given at the branching point is given to the driver. If it is determined that the next branching point is not a branching point requiring guidance at step S50, the process proceeds to step S70, skipping step S60. At step S80, whether the vehicle has arrived at the destination is determined. If the vehicle has arrived at the destination, the entire process completed. If not, the process moves back to step S50 to repeat the steps following step S50.

Figure 3:
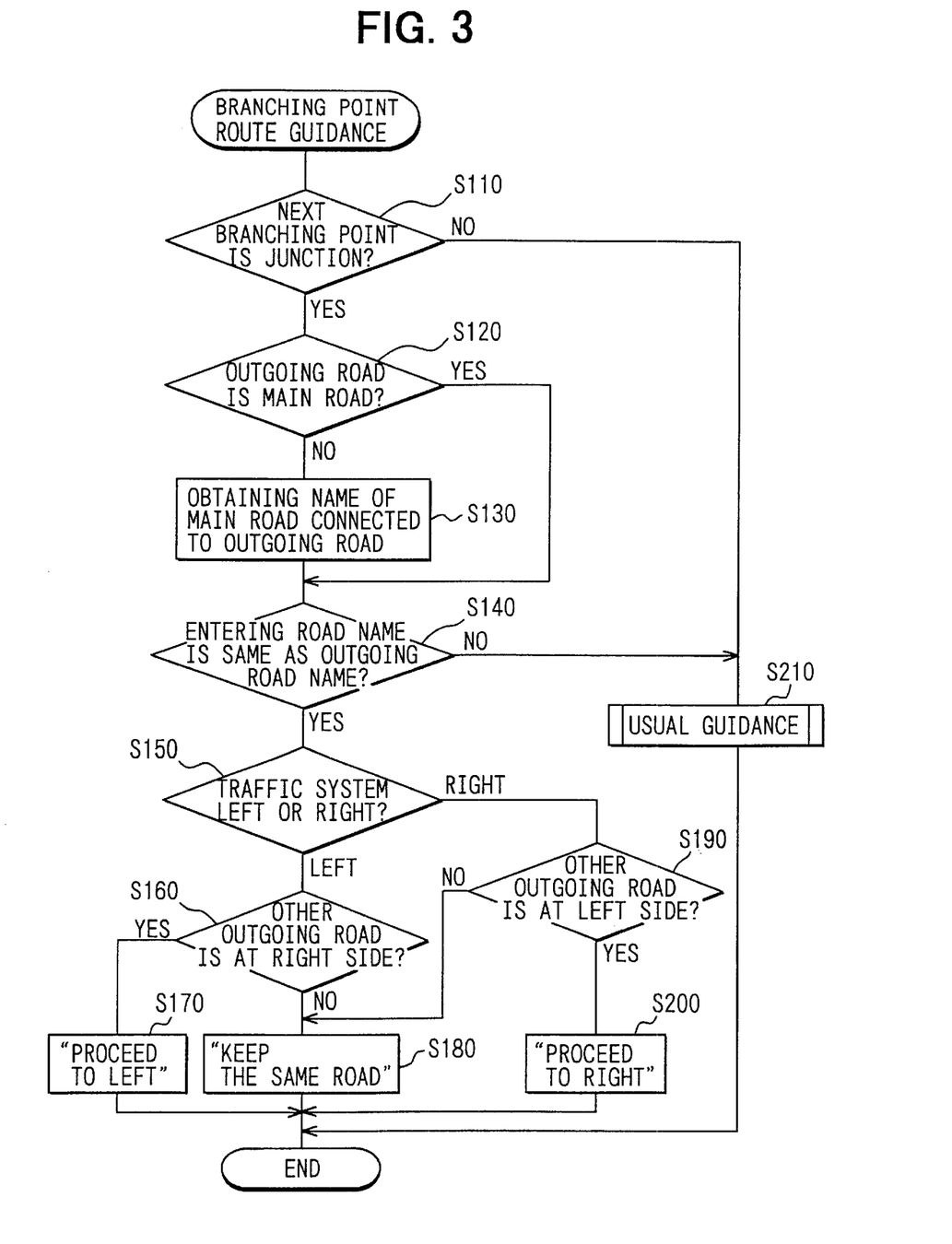
FIG. 3 is a flowchart showing a guidance process at a branching point performed in the navigation device.

The branching point guidance performed at step S60 will be described in detail with reference to FIG. 3. At step S110, whether the next branching point is a junction is determined. If the next branching point is a junction, the process proceeds to step S120. If not, the process moves to step S210, where a usual guidance is given to the driver. That is, instructions such as "turn left," "turn right" or "proceed straight" are given.

If it is determined that the next branching point is a junction at step S110, the process proceeds to step S120. At a junction, a road entering the junction branches out into two or more roads outgoing from the junction, and one of the outgoing roads is a road toward destination. At step S120, whether the outgoing road toward destination is a main road or an auxiliary road connected to a main road is determined. If the outgoing road toward destination is the auxiliary road, the process proceeds to step S130, where the name of the main road connected to the auxiliary road is set as the name of the outgoing road toward destination. Then, the process proceeds to step S140. If it is determined that the outgoing road toward destination is a main road at step S120, the process proceeds to step S140, skipping step S130.

At step S140, whether or not the name of the entering road is the same as the name of the outgoing road toward destination is determined. If the name of the outgoing road toward destination is different from that of the entering road, the process proceeds to step S210, where the usual guidance described above is given to the driver. If the entering road has the same name as the outgoing road toward destination, the process proceeds to step S150, where whether the traffic system is a right side driving system or a left side driving system is checked.

If the traffic system is the left side driving system, then the process proceeds to step S160, where whether the outgoing roads other than the outgoing road toward destination are located at the right side of the outgoing road toward destination or at the left side thereof is determined. If the other outgoing roads are located at the right side of the outgoing road toward destination, the process moves to step S170, where the driver is instructed to proceeds to the left side. If the other outgoing roads are located at the left side, the process moves to step. S180, where the driver is instructed to "KEEP THE SAME ROAD" on which he is now driving. The instruction to keep the same road is indirect guidance to proceeds to the right. Reasons for this will be further explained later with reference to some examples of junctions.

On the other hand, if it is determined that the traffic system is the left side driving system at step S150, the process moves to step S190, where whether the other outgoing roads are located at the left side or at the right side of the outgoing road toward destination is determined. If the other outgoing roads are located at the left side, the process proceeds to step S200, where the driver is instructed to proceed to the right side. If the other outgoing roads are located at the right side, the process moves to step S180, where the driver is instructed to keep the same road on which he is now driving.

Now, referring to FIGS. 4A, 4B and 4C, some examples of the junctions and guidance which is given at respective junctions will be explained. In the example shown in FIG. 4A, the road entering the junction branches out into two roads outgoing from the junction. One of the outgoing roads is the outgoing road toward destination, and those three roads are all expressways. Those roads are named as follows: the entering road as "A", the outgoing road toward destination as "A" which is the same as the entering road (YES at S140), and the other outgoing road as "B". The traffic system is the left side driving system (YES at S150), and the other outgoing road is located at the right side of the outgoing road toward destination (YES at S160). As the driver approaches this junction, he is instructed to "PROCEED TO LEFT" at step S170.

Under the left side driving system as in Japan, it is customary to keep right on the entering road when a route plan indicates that a driver should proceed to an outgoing road having the same name as the entering road. At the junction as shown in FIG. 4A, however, the outgoing road toward destination (which has the same road name "A" as the entering road) branches out to the left side at the junction. Therefore, it is very helpful or even necessary to instruct the driver to "PROCEED TO LEFT" when he approaches such junction as shown in FIG. 4A. If an instruction to "KEEP THE SAME ROAD" were given under this situation, taking into consideration only the road name "A", such an instruction would mislead the driver. For the same reason, the driver is instructed to "PROCEED TO LEFT" even if the outgoing road "A" extends straight from the entering road "A" and the other outgoing road "B" branches out to the right side. In other words, the guidance is not given solely based on a physical structure of a junction, but a customary way of driving is also taken into consideration.

Figure 4A:
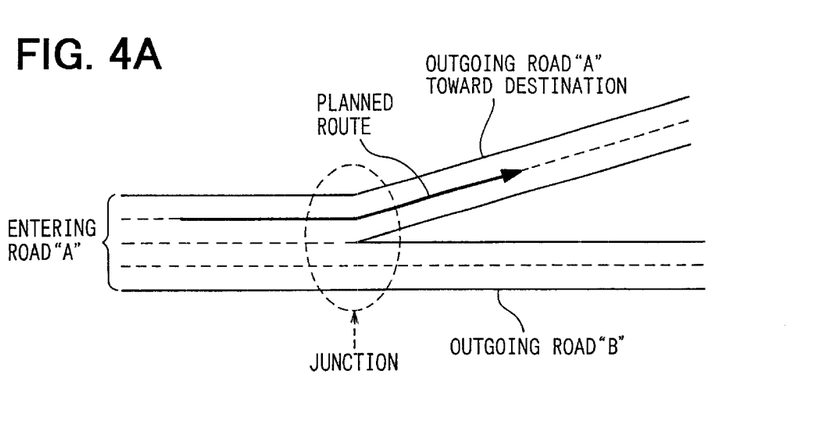
FIGS. 4A–4C are examples of junctions where the route guidance is given to a driver.
Figure 4B:
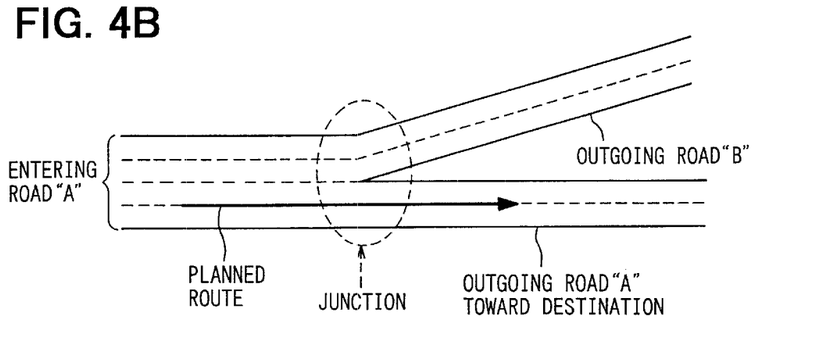

In the example shown in FIG. 4B, an entering road "A" branches out into two roads, an outgoing road "A" toward destination and the other outgoing road "B". The route plan teaches the driver to keep the same road "A" through the junction (YES at S140). The traffic system is the left side driving system (YES at S150), and the other outgoing road "B" is located at the left side of the outgoing road "A" (NO at S160). As the driver approaches this junction, he is instructed to "KEEP THE SAME ROAD". It is appropriate to give such an instruction to the driver because he customarily keeps right on the entering road under this situation.

Figure 4C:
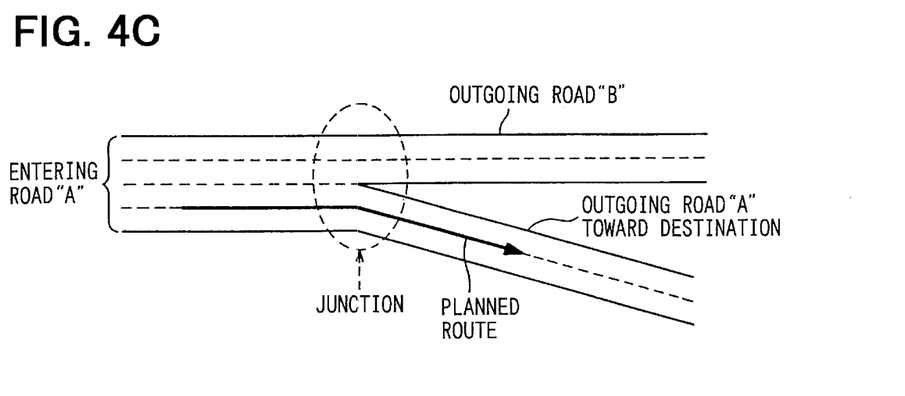

The example of FIG. 4C shows a similar situation as that of the example shown in FIG. 4B, except that the other outgoing road "B" extends straight from the entering road "A" and is located at the left side of the outgoing road "A" toward destination. As the driver approaches this junction, he is instructed to "KEEP THE SAME ROAD" even though the outgoing road toward destination extends to the right side of the junction. It is appropriate to give such an instruction to the driver because he customarily keeps right on the entering road under this situation.

Under the left side driving system as in Japan, the instruction to "PROCEED TO LEFT" is given only when the other outgoing roads are located at the right side of the outgoing road toward destination. Under the right side driving system as in the U.S.A., the instruction to "PROCEED TO RIGHT" is given when the other outgoing roads are located at the left side of the outgoing road toward destination. For example, if the junction shown in FIG. 4B is in the right side driving system, the instruction to "PROCEED TO RIGHT" is given, because the entering road and the outgoing road toward destination are commonly named as "A" (YES at S140) and the other outgoing road "B" is located at the left side (YES at S190). If an instruction to "KEEP THE SAME ROAD" were given under this situation, taking into consideration only the physical structure of the junction, such an instruction would mislead the driver, because it is customary to keep left on the entering road "A" under this situation. Similarly, at the junction shown in FIG. 4C, the instruction to "PROCEED TO RIGHT" is given.

At the junctions exemplified in FIGS. 4A, 4B and 4C, a four-lane entering road branches out into two two-lane outgoing roads. However, the number of the lanes is not limited to those. The entering road and the outgoing roads may have the same number of lanes. The important is to generate guidance which is most helpful to a driver, taking into consideration not only a physical structure of a junction and road names but also a customary way of driving.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A navigation device for use in an automotive vehicle comprising:

means for setting a route plan from a starting point to a destination; and means for generating route guidance when the vehicle approaches a junction, located on the route plan, where a road entering the junction branches out into two or more roads outgoing from the junction, one of the outgoing roads being set as an outgoing road toward destination on the route plan, wherein:

the route guidance gives a driver instructions as to which direction to drive through the junction, based on information as to at which side of the outgoing road toward destination the other outgoing roads are located, if the outgoing road toward destination has a same name as that of the entering road;

wherein the instructions as to which direction to drive are determined also based on a traffic system, a left side driving system or a right side driving system.

2. The navigation device as in claim 1, wherein:

under the left side driving system, the route guidance gives instructions to proceed left if the other outgoing roads are located at a right side of the outgoing road toward destination and gives instructions to proceed straight if the other outgoing roads are located at a left side of the outgoing road toward destination.

3. The navigation device as in claim 1, wherein:

under the right side driving system, the route guidance gives instructions to proceed right if the other outgoing roads are located at a left side of the outgoing road toward destination and gives instructions to proceed straight if the other outgoing roads are located at a right side of the outgoing road toward destination.

4. The navigation device as in claim 1, wherein:

the route guidance generating means determines that the outgoing road toward destination has the same name as the entering road, if the outgoing road toward destination is an auxiliary road connected to a main road having the same name as that of the entering road.

5. The navigation device as in claim 1, wherein:

the route guidance generating means further generates route guidance when the vehicle approaches a branching point other than the junction.

6. The navigation device as in claim 5, wherein:

the route guidance generating means determines whether route guidance is required at the branching point.

7. The navigation device as in claim 1, further including a voice sound generator, wherein:

the instructions to the driver is given by means of the voice sounds.

8. A process of navigating a driver, the process comprising steps of:

setting a route plan from a starting point to destination;

determining whether a branching point ahead located on the route plan is a junction at which a road entering the junction branches out into two or more outgoing roads including an outgoing road toward destination;

determining whether a name of the entering road is the same as a name of the outgoing road toward destination;

determining whether a traffic system is a left side driving system or a right side driving system; and giving the driver instructions to which direction to drive through the junction based on information as to at which side of the outgoing road toward destination the other outgoing roads are located and information as to the traffic system, if the name of the entering road is the same as the name of the outgoing road toward destination.

9. A memory medium storing a computer program for performing the process recited in claim 8.

10. A navigation system for use in an automotive vehicle having a right side driving system, the navigation system comprising:

a device for setting a route plan from a starting point to a destination; and a device for generating route guidance, wherein:

when the vehicle approaches a junction located on the route plan, and a road entering the junction branches out into two or more roads outgoing from the junction, one of the outgoing roads being set as an outgoing road toward destination on the route plan, and where the outgoing road toward destination and the entering road have identical names, the route guidance provides a driver with instructions as to which direction to drive based on a location of the road toward destination relative to the other outgoing roads.

11. The navigation system as in claim 10, wherein if the outgoing road toward destination is left relative to the other outgoing roads, the route guidance provides the driver with instructions to lead the driver to the outgoing road toward destination without specifying that the outgoing road toward destination is located to the left of the other outgoing roads.

12. The navigation system as in claim 11, wherein the route guidance provides the driver with instructions to remain in a lane in which the driver is currently driving.

13. The navigation system as in claim 10, wherein if the outgoing road toward destination is located right relative to the other outgoing roads, the route guidance provides the driver with instructions to lead the driver to the outgoing road toward destination by specifying that the outgoing road toward destination is located to the right of the other outgoing roads.

14. The navigation system as in claim 10, wherein the junction is a junction located either on an exclusive road for automobiles or on an expressway.

15. The navigation system as in claim 10, wherein the route guidance generating device determines that the outgoing road toward destination has a name identical to that of the entering road, if the outgoing road toward destination is an auxiliary road connected to a main road having a name identical to that of the entering road.

16. The navigation system as in claim 10, wherein the route guidance generating device further generates route guidance when the vehicle approaches a branching point other than the junction.

17. The navigation system as in claim 16, wherein the route guidance generating device determines whether route guidance is required at the branching point.

18. The navigation system as in claim 10, further including a voice sound generator for providing the driver with vocal instructions.

19. A navigation system for use in a right side driving system type automotive vehicle, the navigation system comprising:
    a device for setting a route plan from a starting point to a destination;
    a route guiding device for giving a driver instructions as to which direction to drive when the vehicle approaches a junction located on the route plan, where a road entering the junction branches out into an outgoing road toward destination and other outgoing roads;
    a first judging portion for judging whether the outgoing road toward destination has a name identical to that of the entering road; and
    a second judging portion for judging at which side of the other outgoing roads the outgoing road toward destination is located if the first judging portion judges that the outgoing road toward destination has the name identical to that of the entering road, wherein:
    the route guiding device provides the driver with instructions as to which direction to drive through the junction based on judgments made by the second judging portion.

20. The navigation system as in claim 19, wherein if the outgoing road toward destination is located left relative to the other outgoing roads, the route guiding device provides the driver with instructions to lead the driver to the outgoing road toward destination without specifying that the outgoing road toward destination is located to the left of the other outgoing roads.

21. The navigation system as in claim 20, wherein the route guiding provides the driver with instructions to remain in a lane in which the driver is currently driving.

22. The navigation system as in claim 19, wherein if the outgoing road toward destination is located right relative to the other outgoing roads, the route guiding device provides the driver with instructions to lead the driver to the outgoing road toward destination by specifying that the outgoing road toward destination is located to the right of the other outgoing roads.

23. The navigation system as in claim 19, wherein the junction is a junction located either on an exclusive road for automobiles or on an expressway.

24. The navigation system as in claim 19, wherein the first judging portion determines that the outgoing road toward destination has the name identical to that of the entering road if the outgoing road toward destination is an auxiliary road connected to a main road having the name identical to that of the entering road.

25. The navigation system as in claim 19, wherein the route guiding device further provides the driver with instructions when the vehicle approaches a branching point other than the junction.

26. The navigation system as in claim 25, wherein the route guiding device determines whether route guidance is required at the branching point.

27. The navigation system as in claim 19, further including a voice sound generator for providing vocal instructions to the driver.

28. A right side driving system based navigation method, comprising:
    setting a route plan from a starting point to a destination;
    determining whether a branching point located ahead on the route plan is a junction at which a road entering the junction branches out into two or more outgoing roads including an outgoing road toward destination;
    determining whether a name of the entering road is identical to that of the outgoing road toward destination;
    determining to which side of the other outgoing roads the outgoing road toward destination is located; and
    providing a driver with instructions as to which direction to drive through the junction based on a location of the outgoing road toward destination relative to the other outgoing roads.

29. The method of claim 28, wherein if the outgoing road toward destination is located left of the other outgoing roads, providing instructions to lead the driver to the outgoing road toward destination without specifying that the outgoing road toward destination is located to the left of the other outgoing roads.

30. The method of claim 28, further comprising instructing the driver to remain in a lane in which the driver is currently driving.

31. The method of claim 28, wherein if the outgoing road toward destination is located right of the other outgoing roads, providing instructions to lead the driver to the outgoing road toward destination by specifying that the outgoing road toward destination is located to the right of the other outgoing roads.

32. A right side driving system based navigation method, comprising:
    setting a route plan from a starting point to a destination;
    identifying a junction located on the route plan at which an entering road branches out to two or more outgoing roads, one of which is an outgoing road toward destination;

determining whether a name of the entering road is identical to that of the outgoing road toward destination when the driver approaches the junction;

determining at which side of the other outgoing roads the outgoing road toward destination is located; and providing a driver with instructions as to which direction to drive through the junction based on a location of the outgoing road toward destination relative to the other outgoing roads.

33. The method of claim 32, wherein:

if it is determined that the outgoing road toward destination is located left of the other outgoing roads, providing instructions to lead the driver to the outgoing road toward destination without specifying that the outgoing road toward destination is located to the left of the other outgoing roads.

34. The method of claim 33, further comprising instructing the driver to remain in a lane in which the driver is currently driving.

35. The method of claim 32, wherein if it is determined that the outgoing road toward destination is located right of the other outgoing roads, providing the instructions to lead the driver to the outgoing road toward destination by specifying that the outgoing road toward destination is located to the right of the other outgoing roads.

* * * * *